United States Patent Office 3,787,473
Patented Jan. 22, 1974

3,787,473
THIOETHER SUBSTITUTED THIOLCARBONATES
Arnoldus van der Heijden and Leonard Schutte, Zevenaar, Netherlands, assignors to Lever Brothers Company, New York, N.Y.
No Drawing. Filed Dec. 3, 1971, Ser. No. 204,692
Claims priority, application Great Britain, Dec. 7, 1970, 57,986/70
Int. Cl. C07c *154/00*
U.S. Cl. 260—455 B      1 Claim

ABSTRACT OF THE DISCLOSURE

Foodstuffs with improved flavor properties are obtained by incorporation of a diester of monothiocarbonic acid containing radicals characteristic of a flavoring thiol, a secondary or tertiary alcohol and carbonic acid.

These diesters were found to be excellent precursors of flavoring thiols, releasing the thiols at a controlled rate under mild conditions. Particularly suitable diesters have the general formula $R^1$—S—CO—O—$R^2$, in which $R^1$ represents an optionally substituted alkyl, homo- or heterocyclic radical which contains 1-10, preferably 3-7 carbon atoms and not more than 2 hetero atoms which are either oxygen or sulphur and $R^2$ represents a secondary or tertiary hydrocarbyl group containing 3-20 carbon atoms, preferably an alkyl group containing 3-8 carbon atoms.

BACKGROUND OF THE INVENTION

Field of the invention

The invention relates to flavored food products and processes for their preparation. In particular it relates to food products containing certain precursors of flavoring agents having a thiol group which can be represented by the general formula $R^1$—SH, in which $R^1$ represents an optionally substituted alkyl, aryl or heterocyclic radical.

By precursors of flavoring agents are to be understood compounds which yield the flavoring agents when the food products at issue are being manufactured, stored or prepared for consumption. In the present case, preferably the last possibility is aimed at.

The prior art

Many classes of flavoring agents having a thiol group in their molecule are known. Examples are the alkanethiols such as methanethiol, ethanethiol, 1-propanethiol, and butanethiols, substituted alkanethiols such as 1-hydroxypropane-3-thiol, (2-furyl)-methanethiol, aromatic thiols such as benzenethiol, 2-hydroxythiophenol and methylbenzenethiols. Alkylthioalkanethiols, such as 1-methylthioethanethiol, 1-methylthiopropanethiol, 1-ethylthioethanethiol and 1-ethylthiopropanethiol, have been disposed in Tetrahedron Letters, pp. 2321-2322, Pergamon Press, 1971.

Heterocyclic mercapto compounds, more particularly those having a furane or thiophene structure, such as e.g. 2,5-dimethylfuran-3-thiol, 2,5-dimethyl - 4,5 - dihydrofuran-3-thiol, 2-methyltetrahydrofuran-3-thiol, have been disclosed in Dutch patent application 6910103.

The flavoring agents containing a mercapto group have suitable flavors for various applications. However, they suffer sometimes from instability; they may convert into compounds with no or undesirable flavoring properties.

These thiols may e.g. oxidize to disulphides, having different flavors, if at all, which may occur during processing, storage or preparation. These and e.g. losses due to vaporization of flavor compounds may necessitate the incorporation of relatively high initial quantities of the desired flavoring thiols in the food products in order to have the correct amount available in the foodstuff which is ready for consumption.

SUMMARY OF THE INVENTION

According to the present invention certain thiols are applied in the form of a precursor, which releases the flavoring compound at a desired rate, thus avoiding high initial quantities, which is undesirable in the products leaving the factory and more economical as regards the use of flavoring material. It is not necessary that the precursor is converted quantitatively into the thiol flavoring compound but a high conversion is desirable. However, the precursor should not possess interfering flavoring properties.

DESCRIPTION OF THE INVENTION

It has now been found that foodstuffs with improved flavor properties can be obtained by incorporation of a flavoring quantity of a diester of monothiocarbonic acid containing radicals characteristic of a flavoring thiol, a secondary or tertiary alcohol and carbonic acid in the food products.

Thiol precursors incorporated according to the present invention can be represented by the general formula

in which $R^1$ represents an optionally substituted alkyl, homo or heterocyclic radical, which contains 1-10 carbon atoms and not more than two hetero atoms, preferably, the hetero atoms are chosen among oxygen and sulphur. The alkyl, aryl or heterocyclic radical preferably contains from 3-7 carbon atoms and not more than one hetero atom.

Substituents of the alkyl, aryl or heterocyclic radical may be $C_1$-$C_4$ alkyl or alkoxy-, hydroxyl-, keto- oxygen or similar sulphur-containing groups.

More particularly $R^1$ may represent an optionally substituted alkyl, aryl or heterocyclic radical derived from a thiol as described above.

Precursors in which $R^1$ represents a heterocyclic structure as in the following general formulae are preferably incorporated in foodstuffs according to the present invention

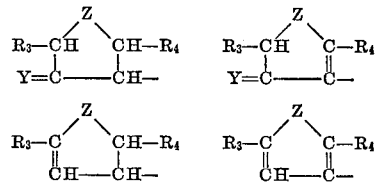

in which Z is an oxygen or a sulphur atom, Y represents two hydrogen atoms, an oxygen atom or a sulphur atom, and $R^3$ and $R^4$ represent hydrogen or an alkyl group, which groups contain 1-4, preferably 1-2 carbon atoms together.

These radicals are characteristic for the following thiol or mercapto compounds from which the diester precursors can be prepared by one of the synthetic routes described below. The compounds are 4-mercapto-5-methyl-tetrahydrofuran-3-one
4-mercapto-2,5-dimethyl-tetrahydrofuran-3-one
3-mercapto-2-methyl-tetrahydrofuran (cis and trans)
3-mercapto-5-methyl-tetrahydrofuran (cis and trans)
3-mercapto-5-methyl-tetrahydrothiophene (cis and trans)
3-mercapto-2,5-dimethyl-tetrahydrothiophene
3-mercapto-2-ethyl-5-methyl-tetrahydrothiophene
4-mercapto-5-methyl-2,3-dihydrothiophene-3-one
4-mercapto-2,5-dimethyl-2,3-dihydrofuran-3-one
3-mercapto-2-methyl-4,5-dihydrofuran
3-mercapto-2,5-dimethyl-4,5-dihydrofuran
3-mercapto-2-methyl-2,3-dihydrothiophene
3-mercapto-2,5-dimethyl-2,3-dihydrothiophene
3-mercapto-2,5-dimethyl-2,3-dihydrofuran
3-mercapto-5-ethyl-2,3-dihydrothiophene
3-mercapto-2,5-dimethylfuran
3-mercapto-2-methylfuran
3-mercapto-5-methylfuran
3-mercapto-2-ethylfuran Another group of preferred precursors are those in which $R^1$ satisfies the general formula

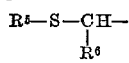

in which $R^5$ and $R^6$ represent an alkyl group containing 1-2 carbon atoms, i.e. a methyl or ethyl group.

In this case $R^1$ may represent a radical derived from one of the following alkylthioalkanethiols such as 1-methylthioethanethiol
1-methylthiopropanethiol
1-ethylthioethanethiol and
1-ethylthiopropanethiol $R^2$ represents a secondary or tertiary hydrocarbyl group containing 3-20 carbon atoms attached to the oxygen with the secondary or tertiary carbon atom.

$R^2$ preferably represents an alkyl group containing 3-8 carbon atoms, preferably a tertiary one.

Examples of the group $R^2$ are 2-alkyl groups such as the isopropyl and secondary butyl groups, 1,1-dimethylalkyl groups such as the tertiary butyl, tertiary amyl and tertiary hexyl group.

The diesters of monothiocarbonic acid, which are applied to impart or impove the flavors of foodstuffs according to the present invention, can be incorporated in the foodstuff by addition to the ingredients or the mixture before, during or after the actual manufacture. The conditions prevailing during the manufacture determine the best moment of addition.

The quantity of the diester incorporated in the foodstuff will vary from one foodstuff to another and may alos be dependent of the actual moment of addition such as to have a suitable quantity of the flavoring thiol in the foodstuff when ready for consumption. Usually quantities of diesters ranging from $1\times10^{-3}-1\times10^{-9}$, preferably $1\times10^{-4}-1\times10^{-7}$ by weight are incorporated.

It is known in the art to decompose certain esters of monothiocarbonic acid by pyrolysis (the so-called Chugaev reaction). The conditions under which this Chugaev reaction takes place differ very much from the conditions under which the foods are prepared for consumption; for example, the temperatures applied in the Chugaev reaction are 200-300° C., and other products are formed, such as alkenes. There is evidence that the mechanism of the reaction taking place in the food at appreciably lower temperatures is different.

In the foodstuff, in the presence of water usually at a pH between 3 and 7, and moderate heating, i.e. between 70-150° C., usually at about 100° C., it is likely that the following overall reaction takes place:

According to the present invention such esters of the flavoring thiols $R^1SH$ are selected, viz, the monothiocarbonic acid esters, which have a satisfactory rate of hydrolysis in the food, yielding the flavoring agent in an adequate amount when the food is prepared for consumption, the ester itself not contributing in an interfering manner to the flavor and not being so volatile that too much escapes from the food during preparation and storage.

The precursor esters can be prepared by methods known in the art. Two generally applicable methods are outlined below. In the first chloroformic acid esters of the flavoring thiols can be made to react with the alcohol $HOR^2$ in the presence of a base such as pyridine, or with an alkali metal alcoholate derived from that alcohol, e.g.:

The starting chloroformate can be prepared by the reaction of phosgene and the flavoring thiol, or a salt thereof:

The second route is to make the compound $R^1X$, in which X represents a suitable halogeno atom, to react with an S-alkali metal salt of the thiocarbonic acid monoester of the alcohol $HOR^2$, for instance

The starting K-salts can be prepared by the reaction of carbonyl sulphide and the alkali metal alcoholate derived from the alcohol $HO-R^2$:

Although both synthetic routes are applicable for the preparation of most diester precursors for certain diesters one of the two possibilities can be used from a practical point of view. In a few exceptional cases still other synthetic routes are preferred.

The foods in which the precursors (latent flavoring agents) have been incorporated are preferably to be heated before they are ready for consumption. Foodstuffs according to the invention in which an ester of monothiocarbonic acid has been incorporated are, for instance, dry, canned and frozen soups, ready meals, croquettes, sauce cubes, bouillon cubes, baking fats, margarine, bread, cakes, products simulating meat, as t.v.p. instant drinks which are prepared with hot water, such as instant coffee. Excellent results have been obtained with meat-simulating products based on vegetable protein, known as t.v.p. or mesophase products. The esters can be incorporated as such or dissolved or dispersed in a carrier, such as a fat, or enrobed with maltose-dextrin, gelatin, gum arabic. They can be mixed with the food ingredients ready to be prepared or mixed with one of the ingredients. The amounts incorporated depend on the kind and wanted amount of thiol flavoring agent, the conditions of the manufacture of the food product and of the preparation of the food for consumption, such as the temperature and heating period and also on the composition of the food; the amount to be incorporated can easily be determined experimentally.

The compounds incorporated in foodstuffs according to the invention may be used in conjunctions with other substances useful for the required purpose. Thus it is possible to use one or more of the compounds belonging to one or more of the classes listed below, although the choice is not restricted to these compounds. Preferably at least one compound of the groups (a) and (b) together with at least one compound of each of the groups, (c), (d) and (e) are present:

(a) amino acids, which can be obtained by any traditional process from vegetable or animal proteins, such as gluten, casein, zein, soya protein etc.;

(b) peptides of similar origin, as well as peptides such as alanylalanine, alanylphenylalanine, alanylasparagine, carnosine and anserine;

(c) nucleotides such as adenosine, guanosine, inosine, xanthosine, uridine and cytidine 5'-monophosphates, as well as their amides, deoxy derivatives, salts, etc.;
(d) monocarboxylic acids, such as saturated or unsaturated fatty acids, for example those with 2 to 12 carbon atoms, lactic acid, glycollic acid and β-hydroxybutyric acid, as well as dicarboxylic acids such as succinic acid and glutaric acid;
(e) pyrrolidonecarboxylic acid and its precursors;
(f) natural sweeteners such as mono- and disaccharides, and artificial sweeteners such as saccharin, cyclamates; and dipeptide esters such as L-aspartyl-L-phenylalanine methyl ester;
(g) 4-hydroxy-5-methyl-2,3-dihydrofuran-3-one and 4-hydroxy-2,5-dimethyl-2,3-dihydrofuran-3-one;
(h) products from the reaction of sulphur-containing amino acids or hydrogen sulphide with reducing sugars or ascorbic acid, or the compounds mentioned under (g) or lower aliphatic aldehydes and ketones;
(i) sulphur compounds such as sulphides and disulphides, for example, dimethyl sulphide and diallyl sulphide; also 2-acetylthiazole and 2-acetyl-2-thiazoline;
(j) guanidines, such as creatine and creatinine;
(k) salts such as sodium chloride and mono- and disodium and ammonium phosphates;
(l) organic phosphates, such as amino acids containing phosphorus;
(m) nitrogen compounds which have not been mentioned above, such as ammonia, amines, urea, indole and skatole;
(n) 4- and 5-alkanolides as well as the esters and salts of the corresponding hydroxy acids such as 5-decanolide, 5-dodecanolide, sodium 5-hydroxydecanoate and the glycerides of 5-hydroxyalkanoic acids, such as the product from the reaction of 5-alkanolides with glycerol;
(o) aldehydes such as ethanol, propanol, 4-heptanol; etc.
(p) ketones, such as methyl ketones with, for example, 5 to 15 carbon atoms, biacetyl, etc.;
(q) esters of 3-oxoalkanoic acids, such as the glycerol esters;
(r) tricholominic and ibotenic acid and their salts;
(s) flavoring compounds such as O-aminoacetophenone, N-acetonylpyrrole, maltol, isomaltol, ethylmaltol, vanillin, ethylvanillin, cyclotene (2-hydroxy-3-methyl-2-cyclopentene - 1 - one), ethone [1-(p-methoxyphenyl)-1-pentene-3-one], coumarin, ethoxymethylcoumarin, etc.;
(t) alcohols, such as ethanol and octanol;
(u) colorants, such as turmeric and caramel;
(v) thickeners, such as gelatin and starch;
(w) emulsifiers, such as diacetyltartaric acid esters of fatty acid monoglycerides.

The quantity of these substances used depends on the nature of the food and that of the other ingredients added, such as herbs and spices, as well as on the odor or flavor desired.

The substances listed above may be incorporated with the flavoring agents according to the invention with the aid of maltose-dextrin, gelatin, gum arabic, or fat. The invention will now be illustrated by the following experiments.

EXPERIMENT 1

The compound O-isopropyl S-[methylthioethyl] thiocarbonate was prepared as follows:

In a two-necked round bottomed flask equipped with a gas introducing tube and a condenser, gaseous carbonyl sulphide (6 g. or 0.1 mole) was introduced into a suspension of potassium isopropoxide (9.9 g. or 0.1 mole) in diethyl ether (60 ml.). The reaction mixture refluxed by the reaction heat. After the addition of carbonyl sulphide was completed, the mixture was cooled and the precipitate was collected by filtration and suspended in dichloromethane (100 ml.). The suspension was cooled to 0° C. and while stirring, 1-methylthio-1-chloroethane (11.0 g. or 0.1 mole, prepared according to H. Böhme and H. Bentler, Chem. Ber. 89 (1956), pages 1464–1468) was added dropwise in 30 mins. The mixture was then kept overnight at 0° C. and filtered. The filtrate was dried over anhydrous magnesium sulphate. The solvent was evaporated off at 30° C. and 10 mm. Hg. Fractional distillation of the residue yielded 11.0 g. (57%) O-isopropyl S-[1-methylthioethyl] thiocarbonate, B.P. 62–64° C. at 0.1 mm. Hg. $n_D^{20}$=1.4914. Infrared absorptions (liquid film) were at 2980, 2939, 2920, 2878, 2862, 2828, 1708, 1700, 1465, 1444, 1436, 1422, 1384, 1373, 1340, 1330, 1230, 1155, 1095, 1055, 974, 951, 911, 847, 810, 728, 697, 673, 520 and 510 cm.$^{-1}$. The NMR spectrum (in $CCl_4$, internal standard Si $(CH_3)_4$) had signals at $\delta$=1.25 (doublet), $\delta$=1.62 (doublet), $\delta$=2.14 (singlet), $\delta$=4.32 (quadruplet) and $\delta$=5.01 p.p.m. (septet).

EXPERIMENT 2

The compound O-tert.butyl S-[1-methylthioethyl] thiocarbonate was prepared as follows:

Gaseous carbonyl sulphide (6 g. or 0.1 mole) was introduced into a two-necked round bottomed flask containing solid potassium tertiary-butoxide (11.2 g. or 0.1 mole). The flask was fitted with a tube for the introduction of the gas and with a cold-finger condenser (at —80° C.). The gas introduced condensed on the condenser and dropped from it directly on the potassium tertiary-butoxide. The temperature of the reaction mixture rose rapidly to 60° C.

After the required amount of carbonyl sulphide had been introduced, the contents of the flask were cooled to 0° C. and acetone (100 ml.) was added. The introduction tube was replaced by a stirrer and the cold-finger condenser by a dropping funnel, through which 1-methylthio-1-chloroethane (11.0 g. or 0.1 mole) was added to the stirred suspension of S-potassium O-tertiary-butyl thiocarbonate at 0° C. After the addition was complete, the mixture was stirred for another 1.5 hours at 0° C. The suspension was filtered and the solvent evaporated from the filtrate at 20° C. and 1 mm. Hg. Fractional distillation of the reaction product yielded 14.8 g. (70%) O - tertiary - butyl S-[1-methylthioethyl] thiocarbonate, B.P. 68° C. at 0.55 mm. Hg. $n_D^{20}$=1.4875. The mass spectrum had a parent peak at m/e 208, a base peak at m/e 41, and further principal peaks at m/e 152, 151, 108, 75, 74, 60, 59, 56, 47, 45 and 39.

Infrared absorptions (solvent $CCl_4$) were at 3000, 2982, 2930, 2875, 2839, 1719, 1702, 1483, 1466, 1453, 1443, 1430, 1399, 1374, 1254, 1207, 1140, 1130, 1090, 1060, 1040, 957, 858, 840, 740, 730, 700, 679 and 670 cm.$^{-1}$.

The NMR spectrum (in tetrachloromethane with tetramethylsilane as an internal standard) had signals at $\delta$=1.54 (singlet), $\delta$=1.67 (doublet), $\delta$=2.22 (singlet), and $\delta$=4.30 p.p.m. (quadruplet).

EXPERIMENT 3

The compound O-[2-(2-methylpentyl)] S-[1-methylthioethyl] thiocarbonate was prepared as follows:

2-methyl-2-pentanol (2.2 g. or 0.022 mole) was added to a suspension of 0.8 g. sodium hydride in a mineral oil (concentration 60%); the mixture was heated until the reaction started. After the reaction was complete, the resulting product was cooled and diethyl ether (10 ml.) was added. Through the suspension, gaseous carbonyl sulphide was bubbled until saturation; 1-methylthio-1-chloroethane (2.2 g. or 0.02 mole) was added and the mixture stirred for 5 min. The ether was evaporated at 30° C. and 10 mm. Hg. The resulting oil was subjected to chromatography over a 28 x 2 cm. column of alumina, eluent trichloromethane, by which the desired product was separated from the reaction mixture. 2.4 g. O-[2-(2-methylpentyl)] S-[1 - methylthioethyl] thiocarbonate (=43%) eluting with the 40–85 ml. solvent, was obtained after evaporation of the eluting solvent. Infrared absorption (solvent $CCl_4$) were at 3000, 2980, 2963, 2937, 2921, 2910, 2879, 1708, 1700, 1470, 1468, 1457, 1446, 1438, 1422, 1387, 1370, 1319, 1298, 1240, 1230, 1180, 1130, 1091, 1058, 973, 953, 910, 870, 850 and 839 cm.$^{-1}$. NMR-spectrum (in CCl$_4$, internal standard Si(CH$_3$)$_4$) had signals at $\delta=0.96$ (triplet), $\delta=1.2$ (multiplet), $\delta=1.4-1.8$ (multiplet), $\delta=1.46$ (singlet), $\delta=1.65$ (doublet), $\delta=2.17$ (singlet), and $\delta=4.28$ p.p.m. (quadruplet).

EXPERIMENT 4

The compound O-tert. butyl S-[1-(1-ethylthioethyl)] thiocarbonate was prepared as follows:

The compound was prepared in a manner as described in Experiment 2 using 1-ethylthio-1-chloroethane B.P. 88° C. at 0.9 mm. Hg as a starting material (prepared according to H. Böhme and H. Bentler, Chem. Ber. 89 (1956), pages 1464–1468). The yield was 65%. The NMR-spectrum (in tetrachloromethane with tetramethylsilane as an internal standard) had signals at $\delta=1.27$ (triplet), $\delta=1.45$ (singlet), $\delta=1.65$ (doublet), $\delta=2.70$ (quartet) and $\delta=4.28$ (quartet).

EXPERIMENT 5

The compound O-tertiary-butyl S-1-butyl thiocarbonate was prepared as follows:

To a suspension of S-potassium O-tertiary-butyl thiocarbonate (17.2 g. or 0.1 mole) in acetone (100 ml.) at 20° C., 1-bromobutane (6.9 g. or 0.05 mole) was added while stirring. The mixture was then refluxed for 1 min. After cooling at 20° C., the mixture was filtered, and the solvent was evaporated from the filtrate at 30° C. and 10 mm. Hg. Fractional distillation yielded 7.2 g. (76%) O-tertiary-butyl S-butyl thiocarbonate, B.P. 82–84° C. at 20 mm. Hg; $n_D^{20}=1.4511$. The mass spectrum was a parent peak at m/e 190 and a base peak at m/e 57, and further principal peaks at m/e 146, 90, 59, 58, 56, 55, 47, 43, and 41. Infrared absorptions (solvent: CCl$_4$) were at 3000, 2980, 2960, 2932, 2877, 1716, 1702, 1473, 1464, 1456, 1410, 1392, 1367, 1246, 1197, 1127, 1034, 1008, 856 and 835 cm.$^{-1}$. The NMR-spectrum (solvent CCl$_4$, internal standard Si(CH$_3$)$_4$) had signals at $\delta=0.92$ (triplet), $\delta=.1-1.8$ (multiplet), $\delta=1.44$ (singlet) and $\delta=2.72$ p.p.m. (triplet).

EXPERIMENT 6

The compound O-[2-(2-methyl pentyl)]-S-1-butyl thiocarbonate was prepared as follows:

1-bromobutane (6.9 g. or 0.050 mole) was added to a stirred suspension of S-potassium-O-2-(2-methyl pentyl) thiocarbonate (10.1 g. or 0.055 mole, prepared as described in Experiment 3) in acetone (100 ml.). The mixture was stirred and refluxed for ten minutes. After cooling and filtration, the solvent was evaporated at 30° C. and 10 mm. Hg, yielding 11 g. of an oil. Fractional distillation gave 9.6 g. (76%) O-[2-(2-methylpentyl)] S-1-butyl thiocarbonate, B.P. 63–65° C. at 0.1 mm. Hg, $n_D^{20}=1.4555$.

Infrared absorptions (liquid were at: 2960, 2930, 2870, 1710, 1465, 1457, 1385, 1369, 1180, 1130, 850, 840 and 675 cm.$^{-1}$.

The NMR-spectrum (solvent CCl$_4$, internal standard Si(CH$_3$)$_4$) had signals at $\delta=0.91$ (triplet), $\delta=1.42$ (singlet), $\delta=1.2-2.0$ (multiplet) and $\delta=2.71$ p.p.m. (multiplet).

EXPERIMENT 7

The compound O-[3-(3-methylpentyl)] S-1-butyl thiocarbonate was prepared as follows:

The potassium salt of O-3-methylpentyl monothiocarbonate was prepared in analogous way to its isomer 2-methyl pentyl monothiocarbonate as is described in Experiment 3, now however using 3-methyl 3-pentanol as the tertiary alcohol. The title compound was obtained in 54% yield; B.P. 86–88° C. at 12 mm. Hg. The NMR-spectrum (in tetrachloromethane with tetramethyl silane as an internal standard) had signals at $\delta=0.92$ (triplet), $\delta=1.1-1.8$ (multiplet), $\delta=1.42$ (singlet) and $\delta=2.72$ (triplet).

EXPERIMENT 8

The compound O-tertiary-butyl S-2-butyl thiocarbonate was prepared as follows:

To a solution of 2-bromobutane (3.45 g. or 0.025 mole) in acetone (50 ml.) was added S-potassium O-tertiary-butyl thiocarbonate (6.5 g. or 0.04 mole). The mixture was refluxed for 1 hour, after which most of the solvent ing slurry water (50 ml.) was added. The resulting mixture was extracted with 3 portions of 50 ml. pentane each. The extracts were dried with anhydrous magnesium sulphate. The solvent was evaporated at 50° C. and 10 mm. Hg, yielding 2.1 g. (44%) O-tertiary-butyl S-secondary-butyl thiocarbonate. Infrared absorptions (liquid film) were at 3000, 2978, 2963, 2926, 2900, 2874, 1715, 1699, 1474, 1453, 1391, 1377, 1367, 1248, 1197, 1120, 1072, 1058, 1034, 1012, 995, 950, 854, 838, 792, 672 and 540 cm.$^{-1}$. The NMR-spectrum (solvent CCl$_4$, internal standard Si(CH$_3$)$_4$) had signals at $\delta=0.95$ (triplet), $\delta=1.28$ (doublet), $\delta=1.43$ (singlet), $\delta=1.4-2.0$ (multiplet) and $\delta=3.2$ p.p.m. (multiplet).

EXPERIMENT 9

The compound O-tertiary-butyl S-furfuryl thiocarbonate was prepared as follows:

To a suspension of S-potassium O-tertiary-butyl thiocarbonate (15.48 g. or 0.09 mole) in 150 ml. of acetone was added furfurylchloride [10.5 g. or 0.09 mole, prepared according to a method described by W. R. Kirner; J. Amer. Chem. Soc. 50, 1955 (1928)]. The reaction mixture was stirred and refluxed for 45 minutes. After filtration and evaporation of the solvent at 30° C. and 10 mm. Hg the remaining oil (14.5 g.) was distilled yielding 10.95 g. (57%) of O-tertiary-butyl S-furfurylthiocarbonate, B.P. 115–119° at 9 mm. Hg; $n_D^{20}=1.4960$.

The mass spectrum had a parent peak at m/e 214 and further principal peaks at m/e 41, 53, 57, 81, 137 and 158.

The NMR-spectrum (solvent CCl$_4$, internal standard Si(CH$_3$)$_4$ had signals at $\delta=1.45$ (singlet), $\delta=3.97$ (doublet), $\delta=6.20$ (multiplet) and $\delta=7.26$ p.p.m. (multiplet).

EXPERIMENT 10

The compound O - tertiary-butyl S-(3-hydroxypropyl) thiocarbonate was prepared as follows:

To a suspension of S-potassium O-tertiary-butyl thiocarbonate (10.32 g. or 0.06 mole) in 100 ml. of acetone was added 3-chloro propanol (8.5 g. or 0.09 mole). The reaction mixture was stirred and refluxed for 2.5 hours. After filtration and evaporation of the solvent at 30° C. and 10 mm. Hg the remaining oil (10.58 g.) was distilled yielding 5.76 g. (50%) of O-tertiary-butyl S-(3-hydroxy propyl) thiocarbonate, B.P. 93°–95° at 0.3 mm. Hg; $n_D^{20}=1.4788$.

The NMR-spectrum (solvent CCl$_4$, internal standard Si(CH$_3$)$_4$) had signals at $\delta=1.43$ (singlet), $\delta=1.82$ (quartet), $\delta=2.83$ (triplet), $\delta=3.26$ (singlet) and $\delta=3.58$ p.p.m. (triplet).

EXPERIMENT 11

The compound O-tertiary-butyl S-phenyl thiocarbonate was prepared as follows:

Phenylthiocarbonyl chloride [17.7 g. or 0.102 mole, prepared according to a method described by M. H. Rivier; Bull. Soc. Chim. [4] 1,733 (1907)] was added to a precooled (−20° C.) suspension of 11.9 g. (0.106 mole) of potassium tertiary-butoxide in 150 ml. of tetrahydrofuran. The reaction mixture was stirred at room temperature for 1 hour. After filtration and evaporation of the solvent at 30° C. and 10 mm. Hg, the remaining oil was distilled yielding 5.0 g. of O-tertiary-butyl S-phenyl thiocarbonate, B.P. 97–100° at 1.0 mm. Hg.

A second fractional distillation was needed to obtain the pure product; yield 3.1 g. (14.3%); B.P. 70–74°, 0.2 mm. Hg, $n_D^{20}=1.5280$.

The NMR-spectrum (solvent $CCl_4$, internal standard $Si(CH_3)_4$) had signals at $\delta=1.45$ (singlet) and $\delta=7.2$–7.5 p.p.m. (multiplet).

EXPERIMENT 12

The compound O-tertiary-butyl S-[3-(2-methyltetrahydrofuryl)] thiocarbonate was prepared as follows:

3-chloro-2-methyltetrahydrofuran (4.8 g. or 0.04 mole; prepared according to a method described by L. Crombie and S. H. Harper, J. Chem. Soc. 1950, pages 1714–1722) was added to a suspension of S-potassium O-tertiary-butyl thiocarbonate (15 g. or 0.08 mole, prepared as described in Experiment 2) in dimethylformamide (60 ml.). The mixture was stirred at 100° C. for 1 hour, and then cooled to 0° C. Water (200 ml.) was added and the resulting turbid mixture was extracted with 3 portions of 50 ml. pentane each. The extract was dried with anhydrous magnesium sulphate. The solvent was evaporated at 30° C. and 10 mm. Hg, yielding 1.2 g. of an oil, from which O-tertiary-butyl S-[3-(2-methyltetrahydrofuryl)] thiocarbonate was isolated by gas chromatography over a 300 x 0.4 cm. all glass column packed with a diatomaceous earth loaded with 3% silicone gum, the temperature being programmed from 100–200° C. at a rate of 4° C./min. Yield 14%. The mass spectrum had a parent peak at m/e 218, a base peak at m/e 57 and further principal peaks at m/e 85, 84, 74, 73, 56, 55, 45, 43 and 41. Infrared absorptions (solvent: $CCl_4$) were at 3000, 2980, 2930, 2865, 1717, 1702, 1473, 1450, 1392, 1380, 1368, 1244, 1196, 1128, 1015 and 853 cm.$^{-1}$. The NMR-spectrum (in $CCl_4$, internal standard $Si(CH_3)_4$) had signals at $\delta=1.17$ (doublet), $\delta=1.37$ (singlet), $\delta=1.5$–2.7 (multiplet), $\delta=3.1$ (multiplet) and $\delta=3.4$–4.0 p.p.m. (multiplet).

EXPERIMENT 13

The compound O-tertiary-butyl S-[3-(2,5-dimethyl-4,5-dihydrofuryl)] thiocarbonate was prepared as follows:

3 - chloro-2,5-dimethyl-2-hydroxytetrahydrofuran (150 mg. or 0.001 mole; prepared by hydrolysis of the chlorination product of 2-acetyl-4-pentanolide, which was prepared according to E. R. Buchman, J. Am. Chem. Soc. 58 (1936), pages 1803–1805) was added to a suspension of S-potassium O-tertiary-butyl thiocarbonate (260 mg. or 0.015 mole) in acetone (10 ml.). The mixture was allowed to stand at ambient temperature for 1 hour; the solvent was then evaporated at 30° C. and 10 mm. Hg. Water (25 ml.) was added to the residue and the resulting mixture extracted with 3 portions of 25 ml. pentane each. The extract was dried with anhydrous magnesium sulphate and the solvent was evaporated at 30° C. and 10 mm. Hg. The reaction product was purified by thin layer chromatography on 1 mm. thick silica gel plates, using trichloromethane as the eluent; 10 mg. (4%) of O-tertiary-butyl S-[3-(2,5-dimethyl-4,5-dihydrofuryl)] thiocarbonate was obtained. Infrared absorptions (solvent: $CCl_4$) were at 3000, 2981, 2928, 2861, 1720, 1697, 1650, 1474, 1453, 1440, 1392, 1377, 1369, 1330, 1245, 1226, 1197, 1122, 1062, 1023, 958, 920, 897, and 838 cm.$^{-1}$. The NMR-spectrum (solvent $CCl_4$, internal standard $Si(CH_3)_4$) had signals at $\delta=1.38$ (doublet), $\delta=1.48$ (singlet), $\delta=1.85$ (doublet), $\delta=2.37$ and 2.80 (both multiplets) and $\delta=4.65$ p.p.m. (multiplet).

EXPERIMENT 14

The compounds O-tertiary-butyl S-[2,5-dimethylfuryl] thiocarbonate was prepared as follows:

Phosgene (7.4 g. or 0.075 mole) was bubbled into a solution of 3-mercapto-2,5-dimethylfuran (6.4 g. or 0.050 mole) in 30 ml. of toluene, which was cooled to 5° C. and vigorously stirred. Then, 5.3 g. (or 0.050 mole) of anhydrous sodium carbonate in 65 ml. of water was added dropwise. After the addition was complete the cooling bath was removed and stirring was continued for two hours at room temperature. The toluene layer was separated, dried over anhydrous sodium sulphate and after filtration, evaporated to dryness at 30° C. and 10 mm. Hg.

The residue was added dropwise to a suspension of 5.61 g. of potassium tertiary-butoxide in 50 ml. of tetrahydrofuran. The mixture was stirred and refluxed for half an hour. After cooling and filtration, the soltuion was evaporated to dryness at 30° C. and 10 mm. Hg leaving 9.5 g. of an oil. The title compound was isolated by preparative gas chromatography; $n_D{}^{20}=1.4970$.

The mass spectrum had a parent peak at m/e 228 and further principal peaks at m/e 128, 127, 113, 85, 57 and 43.

EXAMPLES 1–14

A dry soup-base was prepared from the following ingredients:

| | G. |
|---|---|
| Vegetable fat | 50 |
| Monosodium glutamate | 10 |
| Casein hydrolysate | 20 |
| Milk powder | 10 |
| Herbs and spices | 4.6 |
| Salt | 60 |

Samples of 10 mg. of the compounds listed in the following table prepared as described above were boiled for 60 min. in 1 l. water, to which 17.2 g. of the above dry soup base had been added. A stream of nitrogen was swept over the surface of the boiling mixture and led through two traps cooled at −30° C. and −196° C. respectively.

The formation of thiol was demonstrated by subjecting the contents of the second trap to gas chromatography on a 3 meters x 2 millimeters (internal diameter) glass column packed with 10% polyethylene glycol of molecular weight 20,000 on 80–10 mesh acid-washed silanised diatomaceous earth in a Hewlett Packard 5750 instrument. The compounds were identified by comparison of their retention times with those of model compounds and/or collecting the effluent and by subjection to mass spectrometry.

| Ex. | Thiocarbonate | Formation of thiol |
|---|---|---|
| 1 | O-isopropyl S-(1-methylthioethyl) | + |
| 2 | O-tert-butyl S-(1-methylthioethyl) | ++ |
| 3 | O-2(2-methylpentyl) S-(1-methylthioethyl) | +++ |
| 4 | O-tert-butyl S-(1-ethylthioethyl) | ++ |
| 5 | O-tert-butyl S-1-butyl | + |
| 6 | O-2(2-methylpentyl) S-1-butyl | ++ |
| 7 | O-3(3-methylpentyl) S-1-butyl | ++ |
| 8 | O-tert-butyl S-2-butyl | + |
| 9 | O-tert-butyl S-furfuryl | +++ |
| 10 | O-tert-butyl S-1-(3-hydroxypropyl) | + |
| 11 | O-tert-butyl S-phenyl | ++ |
| 12 | O-tert-butyl S-3-(2-methyltetrahydrofuryl) | ++ |
| 13 | O-tert-butyl S-3-(2,5-dimethyl-4,5-dihydrofuryl) | + |
| 14 | O-tert-butyl S-3-(2,5-dimethylfuryl) | + |

NOTE.—+++ =good; ++ =Distinct; + =Slight.

EXAMPLE 15

A dry meat and vermicelli soup mixture was prepared from the following ingredients:

| | Grams |
|---|---|
| Dried Beef | 40 |
| Beef fat | 50 |
| Vermicelli | 200 |
| Chopped dried carrots | 25 |
| Dried onions | 30 |
| Dried leek | 2 |
| Monosodium glutamate | 10 |
| Casein hydrolysate | 20 |
| Milk powder | 10 |
| Herbs and spices | 4.6 |
| Salts | 60 |

From this mixture 500-ml. samples can be prepared by boiling 30 g. with 0.5 liter water.

In an introductory experiment 0.05 mg. of 1-methylthioethanethiol dissolved in 0.25 g. hardened fat was added to 30 g. dry mix; and to another 30 g. amount only 0.25 g. hardened fat was added.

Soups were prepared from both portions by boiling in 0.5 l. water for 7 min. During the first minute of the boiling step a strong, overpowering smell evolved from the soup containing 1-methylthioethanethiol. After boiling, the two soups were subjected to a triangle test. Only 5 out of 17 tasters made a correct distinction between the two samples. Addition of the thiol as such to the dry soup mix before boiling consequently does not contribute to the aroma of the soup during consumtion. Three experiments were done to indicate the favorable use of the precursor in this product.

In the first experiment, to one portion of 30 g. dry mix of the previous example was added 0.05 mg. O-tert-butyl S-(1-methylthioethyl) thiocarbonate dissolved in 0.25 g. hardened fat; to another portion only the same amount of hardened fat was added. Soup was prepared from both portions by boiling for 7 min.; they were subjected to a triangle test by a trained panel of 24 persons, of whom 17 ($p=0.001$) could distinguish between both samples. In the second experiment, to one portion after boiling for 7 min. was added 0.004 mg. 1-methylthioethanethiol dissolved in hardened fat. It was tested against the same blank, 14 tasters out of a trained panel of 17 persons could distinguish between both samples ($p=0.001$)

In a third experiment, to one portion 0.05 mg. O-tert-butyl S-(1-methylthioethyl) thiocarbonate dissolved in hardened fat was added, which portion was then boiled for 7 min., to a second portion 0.004 mg. 1-methylthio-ethanethiol dissolved in the same amount of hardened fat was added just before testing after the mixture had been boiled for 7 min. In a triangle test by the same trained panel of 24 persons, only 10 could distinguish between the samples.

From these experiments it is concluded that the addition of the precursor thiocarbonate before boiling has the same flavoring effect as the addition of an equivalent quantity of the thiol flavoring agent after boiling.

EXAMPLE 16

In a model experiment, 10 mg. O-tert-butyl S-(1-methylthioethyl) thiocarbonate was added to a beef noodle soup in a 500-ml. can. The can was sealed and sterilized at 118° C. for 1 hour. After the opening of the can, the thiocarbonate ester could be shown to be still present by subjecting the contacts of the can to steam distillation under diminished pressure and trapping the volatiles in a vessel at −196° C. After boiling the sterilized soups for 30 min. and sweeping the content with nitrogen, again trapping the volatiles in a vessel at −196° C., 1-methylthioethanethiol was shown to be present.

It can be concluded that enough precursor survives sterilization to yield the thiol flavoring agent when preparing the canned soup for consumption.

EXAMPLE 17

To 25 g. instant coffee powder (Nescafé ex Nestlé, Switzerland) 0.003 mg. O-t-butyl S-furfuryl thiocarbonate dissolved in 0.001 ml. medium-chain length ($C_8$–$C_{10}$) triglyceride was added. This powder was preferred over a powder without addition by 16 out of 20 tasters because of its mild coffee aroma.

The same amount (0.003 mg.) of furfurylmercaptan added as a solution in the same triglyceride to 25 g. instant coffee powder was unanimously rejected, because of the strong, repellent smell.

The instant coffee powder containing the O-t-butyl S-furfuryl thiocarbonate was dissolved in warm water and compared with an instant coffee without addition treated in the same manner. Of 11 tasters 8 preferred the coffee with the addition, 1 preferred the untreated instant coffee, and 2 had no preference.

EXAMPLE 18

To 9 kg. "soyafluff W" a defatted soya bean meal (ex Central Soya, Chicago, Ill., U.S.A.), 1.8 l. water and 90 g. vegetable fat (M.P. 38° C.) were added. To one 3 kg. part of the meal 3.6 g. 1-methylthioethanethiol was added and to another 3 kg. part 3.0 g. O-t-butyl S-(1-methylthioethyl) thiocarbonate, whereas the third part contained no extra addition. The meal was then extruded at 165° C. from a normal plastic extruder (internal diameter 30 mm.). Three varieties of textured vegetable protein (t.v.p.) chunks (size 8 x 2 mm.) were obtained. Of each variety 5 g. chunks were rehydrated in 50 ml. boiling water containing 350 mg. salt and 100 mg. monosodium glutamate during 15 minutes.

A panel of 11 tasters could not distinguish between the first and third variety, whereas the second variety containing the thiocarbonate was preferred by all tasters because of its meat-like flavor, due to 1-methylthioethane thiol generated during rehydration in boiling water.

EXAMPLE 19

A veal ragout was prepared from the following ingredients:

|  | Grams |
| --- | --- |
| Chopped veal | 400 |
| Mushrooms | 80 |
| Rice flour | 140 |
| Vegetable fat | 80 |
| Herbs and spices | 4.7 |
| Salt | 12 |
| Monosodium glutamate | 6 |

The ragout was distributed over 3 cans of 200 ml. To the contents of the first can 1 mg. O-t-butyl S-(3-(2-methyltetrahydrofuryl)) thiocarbonate was added. The cans were sealed and sterilized at 120° C. for 1 hour. After a week the cans were opened and 0.2 mg. of 2-methyltetrahydrofuryl-3-thiol was added to the contents of the second can. The contents of the three cans were then heated and ranked by a panel consisting of 7 trained tasters. The flavor of the contents of the first can we unanimously judged to resemble the flavor of the second can, whereas the ragout of the third can, containing no extra addition, lacked a roast meat-like top note. The precursor added before sterilization thus gives the same flavor impression as the thiol added as such immediately before consumption.

EXAMPLE 20

1 kg. defatted "soyafluff W" (ex Central Soya, Chicago, Ill., U.S.A.) was mixed with 10 l. water containing 0.1% sodium sulphite. The insoluble carbohydrates were removed by centrifugation. The supernatant liquid was then adjusted to pH 4.6–4.9 by addition of hydrochloric acid. The precipitate was collected by centrifugation. Salt and water were added until a final concentration of 30% protein (w./w.) and 2% salt (w./w.). To a 50 g. portion of this solution 0.25 mg. O-tert-butyl S-(1-methylthioethyl) thiocarbonate was added. After thorough mixing a dialysis tube was filled with this portion and closed at both ends with a knot. 50 g. of the protein solution without further addition was treated similarly. Both sausages obtained in this way were gelified in boiling water for 30 minutes. The skin was then peeled off and the heat-set protein was cut into lumps of about 1 g. each.

The lumps containing the thiocarbonate and the unflavored lumps were separately added to two equivalent soup bases prepared by addition of 200 ml. water to 3.5 g. of the dry soup base of Examples 1–14. Both soups were canned and heat sterilized at 120° C. for 60 minutes. After storage for a few days the cans were heated in boiling water for 20 minutes. The cans were opened and the mesophase lumps were picked out.

The majority of a panel consisting of 8 tasters preferred the lumps to which the thiocarbonate had been added, because of their more attractive meat-like flavor.

We claim:
1. A diester of monothiocarbonic acid having the general formula

$$R^5-S-CH(R^6)-S-CO-O-R^2$$

in which $R^2$ represents a secondary or tertiary alkyl group of 3–8 carbon atoms and $R^5$ and $R^6$ a methyl or ethyl group.

References Cited

Bohme, Die Pharmazie, vol. 22, No. 11, 1967, pp. 624–625.

LEWIS GOTTS, Primary Examiner

D. R. PHILLIPS, Assistant Examiner

U.S. Cl. X.R.

99—140